Patented Apr. 18, 1950

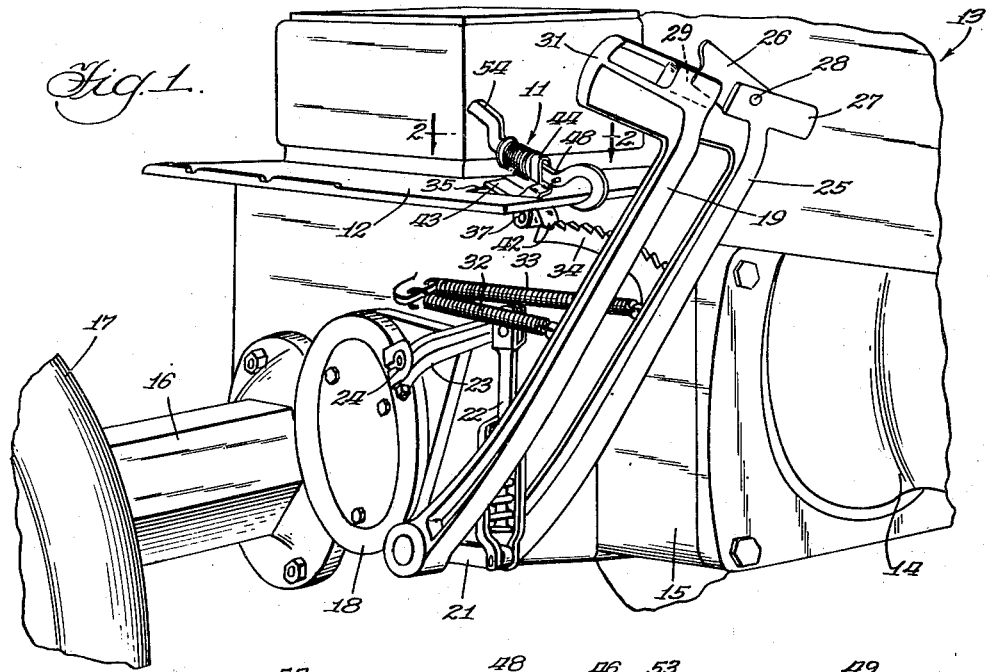

2,504,258

UNITED STATES PATENT OFFICE 2,504,258

BRAKE LOCKING DEVICE

Adolph Elenewicz, Chicago, Ill., assignor to International Harvester Company, a corporation of New Jersey Application March 9, 1949, Serial No. 80,477

11 Claims. (Cl. 74—542)

1

This invention has to do with pedal locking devices and more particularly concerns a latch mechanism for releasably retaining a pawl in cooperative relation with a ratchet attached to a pedal and thereby selectively conditioning the ratchet and pawl for alternatively holding the pedal to an advanced position or permitting the pedal to return from the advanced position.

An important object of this invention is the provision of a device manipulatable by the foot of a vehicle operator for selectively latching or unlatching a pawl into or from a position wherein it is cooperable with a ratchet for holding a foot-operated pedal, or the like, into a position to which it has been advanced. A releasable locking device of this type is particularly useful in connection with the brake pedal of tractors so the service brakes thereof may also serve as parking brakes. A typical use of such a device is upon a tractor having a belt pulley rotatable about an axis extending transversely of the tractor whereby the tractor can be driven forwardly or reversely for tightening a belt extending between the pulley and a belt-driven apparatus disposed remotely from the tractor. Upon the belt becoming sufficiently tight, the tractor brake will be applied while the brake locking device is conditioned for holding a pawl in cooperative relation with a ratchet movable with the brake pedal, whereby the pedal will be retained in its most advanced brake-applying position.

A further object is the provision of a pedal locking device utilizable with a tractor having a footrest platform containing an opening wherein a pawl is mountable about a horizontal axis for pivoting to and from a cooperative position with a ratchet disposed below the platform for movement with a brake pedal, and the device including a pilot element projecting above the platform from the pawl and receivable of a latch member slidable within the pilot element into releasable latching engagement with means on the platform to exert force through a spring to the pawl for pivoting it into the cooperative relation with the ratchet.

A further object is the provision of a latching device according to the preceding object wherein the hook is formed upon an end of a spring distorting member piloted for endwise movement in the pilot element and having a terminal portion at its opposite end cooperable with the toe portion of an operator's shoe to concurrently endwise move and pivot the member for placing the hook in hooking relation with the hookable means therefor on the platform. Said terminal

2 portion of the spring distorting member is also cooperable with the sole portion of an operator's shoe to receive endwise displacing and pivoting force for unhooking the hook from the hookable means.

The above and other desirable objects inherent in and encompassed by the invention will be more fully understood upon reading the ensuing description and the appended claims with reference to the annexed drawings, wherein:

Fig. 1 is a fragmentary perspective view directed horizontally toward the front side of a rear axle housing of a tractor and a side portion of the tractor body from which the rear axle housing projects, the view including a pair of brake pedals and a brake locking device embodying the preferred form of the invention associated with one of the pedals.

Fig. 2 is a plan view of a pawl and control means therefor of the brake locking device shown in Fig. 1 and taken at a plane indicated by the line 2—2 of Fig. 1, but showing such control means in a released condition instead of in the latched or energized condition illustrated in Fig. 1.

Fig. 3 is a fragmentary sectional view taken on the line 3—3 of Fig. 2, showing the locking device in side elevation.

With continued reference to the drawings and particularly to Fig. 1, the brake locking device constituting the preferred embodiment of this invention is there designated 11 and mounted upon a footrest platform 12 disposed horizontally upon the rear portion of a wheel type tractor 13. Said tractor has a narrow waist body portion 14 extending rearwardly from the engine and including a drive shaft leading rearwardly into a change-speed and differential gearing compartment 15 from which axle housings 16, one being shown, project coaxially and oppositely. Each axle respectively in the axle housings 16 is drivingly connected with a traction wheel 17, one being shown.

A brake for the traction wheel 17 is contained within a brake housing 18 projecting laterally from the compartment 15, Fig. 1. A similar brake housing projects outwardly from the opposite side of the compartment 15 and contains a brake for the other traction wheel, not shown. The brake in the brake housing 18 is controlled by a brake pedal 19 with which it is connected through a linkage comprising an arm 21 constrained for rocking motion with the pedal 19, a link 22 connected at its lower end with the arm 21, and a rockable arm 23 connected with the upper end of the link 22. Arm 23, when rocked, rocks a shaft 24 connected with the brake in housing 18. An adjacent pedal 25 is operably connected by means not related to this invention with the brake in the housing at the opposite side of the compartment 15.

The brakes for the traction wheels can be operated independently to assist in steering the vehicle when a latch member 26, pivotally connected with the pedal pad 27 of pedal 25 by a pin 28, is pivoted upwardly out of a notch 29 therefor on the back side of the pedal pad 31 of the pedal 19. When the latch 26 is in the notch 29, as illustrated in Fig. 1, forward pressure upon either of the pedal pads 27—31 will cause simultaneous operation of the vehicle brakes. The pedal pads are so connected when the brakes are to be used as service brakes instead of as steering brakes. Contraction springs 32 and 33 normally hold the brake pedals retracted and the brakes released.

When it is desired to use the service brakes as parking brakes while the operator leaves the vehicle, the locking device 11 mounted upon the platform 12 will be set for causing cooperation between its pawl 39 and a rack type ratchet 34 mounted on the shank of pedal 25 for holding the pedals in their position farthest advanced incident to the brakes having been applied.

The platform 12 for the operator's feet contains a rectangular opening 35 along side of which apertured ears 36 and 37 depend. These ears support transverse bearing means in the form of a pivot pin 38 for the pawl 39. This pivot pin is disposed in the apertures of the ears and through apertures 40 of flange portions 41, projecting downwardly from opposite sides of the pawl.

Pawl 39 has a ratchet-engaging portion 42 spaced transversely of and horizontally from the pivot axis a of the transverse bearing means 38. This ratchet-engaging portion of the pawl is disposable in cooperating relation with the ratchet 34 when a tail portion 43 of the pawl is raised, as illustrated in Fig. 1.

A pilot element 44 is attached to the upper side of the pawl 39. This pilot element is bent into shape from a flat strip of metal and has a flat base 45 welded to the upper side of the pawl. The pilot element also has upwardly-extending parallel opposed faces 46 and 47 arranged perpendicularly to the axis a. These faces 46 and 47 cooperate to pilot an elongated spring-distorting member 48 for universal movement within a plane parallel to the planes of said faces. That is, the member 48 is movable endwise between the faces in addition to being transitorily movable vertically and to being pivotable. A downwardly turned hook 49 is formed upon one end of the member 48 generally above the ratchet-engaging portion 42 of the pawl. An intermediate portion of the member 48 rearwardly of the pilot element is surrounded by a helical expansion spring 51 which is held captive between the pilot element and a pin 52 in the member 48. Rearward movement of the member 48 under the force of the captive spring 51 is limited by a second pin 53 which abuts against the front side of the pilot element. A terminal portion 54 manipulatable by the toe of an operator's shoe extends upwardly and endwise rearwardly from the spring distorting member 48.

Operation of the device:

When the operator wishes to leave the brakes of the vehicle "on" without continuation of manual force applied to the brake pedals, he will slide the toe cap of his shoe forwardly on the platform 12, beneath the terminal portion 54 of spring distorting member 48 and thus force the member 48 endwise forwardly in the pilot element 44 while compressively distorting the spring 51. After the member 48 has been moved sufficiently far forwardly to place the lower end of the hook 49 forwardly of the front edge of platform 12, an upward component of force by the operator's toe beneath the terminal portion 54 will cause pivoting of the member 48 in the pilot element to force the hook 49 downwardly into hooked relation about the front edge of the platform, as illustrated in Fig. 1. This manipulation of the spring distorting member 48 can be quickly and conveniently done by single forward motion of the operator's foot. The spring 48 is thus caused to exert force through the pilot element 44 to the pawl 39 for yieldably forcing the ratchet engaging portion 42 thereof against the ratchet to establish a cooperative relation therewith. Thereafter, when the brake pedal 25 is pressed forwardly the pawl will be cooperable with the ratchet for retaining the pedal as far forwardly as the operator desires to press it. Assuming the latch 26 to have been in the position illustrated in Fig. 1 for connecting the brake pedals together, both brakes will be applied. The operator can then leave the vehicle parked without likelihood of it rolling or creeping from the parked position.

Later, when it is desired to allow the brake pedals to be operated in the normal manner, causing the brakes to be engaged only while manual pressure is applied thereto, the operator will release the hook 49 from the front edge of the platform simply by pressing downwardly and forwardly with the sole portion of his shoe upon the terminal portion 54. This will compress the spring 51 incident to moving the hook 49 forwardly far enough to be released and be moved upwardly from its connection with the platform 12 as the member 48 is pivoted in the pilot element 44. After this occurs, the operator removes his foot from the terminal portion 54 and allows the spring 51 to return the spring distorting member 48 into the position relatively to the pilot element 44, illustrated in Figs. 2 and 3.

The parts are so constructed and arranged that when the spring distorting member 48 is retracted with its pin 53 against the pilot element 44, the combined center of mass of the pawl 39, element 44, member 48 and spring 51 will be rearwardly of the transverse bearing axis a so there will be gravitational bias of the pawl into the inoperative position shown in Fig. 3.

Having thus described a single preferred form of the invention with the view of completely and concisely illustrating same, and contemplating that changes and midifications not departing from the scope of the invention will occur to those skilled in the art, I claim:

1. In a brake locking device, a brake pedal, a ratchet connected with said pedal for movement therewith, a pawl-supporting structure, a pawl pivotally mounted on said structure for pivoting into a position cooperable with the ratchet to hold the brake pedal in a brake-applying position, said pawl being normally pivoted into an inactive position out of the cooperative relation with the ratchet, a pawl-actuating spring distortable to exert a force on the pawl to pivot it into the cooperative relation with the ratchet, a spring distorting member mounted on the pawl and displaceable relatively thereto into an active position for distorting the spring, and means on said spring distorting member for releasably attaching the same to said mounting means while in such active position for holding the spring distorted.

2. In a brake locking device, a brake pedal, a ratchet connected with said pedal for movement therewith, a pawl-supporting structure, a pawl mounted on said structure for adjustment between a position wherein such pawl is cooperative with the ratchet to hold the brake pedal in a brake-applying position and a position wherein such pawl is non-cooperative with the ratchet, said pawl being biased toward the non-cooperative position, a pawl-actuating spring distortable to exert a force on the pawl to place it in the cooperative position with the ratchet, a spring distorting member displaceable relatively to said mounting means into an active position for distorting the spring, and means for connecting the spring distorting member with the mounting means for releasably retaining it in the active position and thereby holding the spring distorted.

3. In combination upon a vehicle, an operator's footrest platform containing an opening, a pedal pivoted on the vehicle at a position below said platform and extending above such platform, a horizontally extending ratchet below the platform and connected with the pedal for movement therewith, a pawl mounted in the platform opening and pivotal to and from a position wherein it is cooperative with the ratchet, said pawl being biased out of said cooperative position, a pilot element on said pawl above said platform, a spring distorting member piloted in said pilot element for alternate advancive and retractive movement transversely of the pivot axis of the pawl, a spring interposed between said spring distorting member and said pilot element for reacting upon said pilot element to yieldably place the pawl in the cooperative position with the ratchet when said distorting member is advanced, and means for releasably retaining the spring distorting member advanced.

4. In combination with a vehicle having an operator's footrest platform containing an opening and a brake holding ratchet below the platform where it is movable fore and aft of the vehicle: a pawl pivotally supported on the platform within said opening and for pivotal movement about an axis extending transversely of the vehicle, said pawl being biased out of a pivoted position placing a portion thereof in cooperative relation with the ratchet, a pilot element on the pawl above said platform, a spring distorting member slidable fore and aft of the vehicle within said pilot element, a spring interposed between said spring distorting member and said pilot element for reacting upon said pilot element to place the pawl in the cooperative position with the ratchet incident to advance of the spring distorting member forwardly of the vehicle, and means for releasably retaining the spring distorting member advanced.

5. In combination with a vehicle having an operator's footrest platform containing an opening and a brake holding ratchet below the platform where it is movable fore and aft of the vehicle: a pawl pivotally supported on the platform within said opening and for pivotal movement about an axis extending transversely of the vehicle, said pawl being biased out of a pivoted position placing a portion thereof in cooperative relation with the ratchet, a pilot element on the pawl above said platform, an elongated spring distorting member extending fore and aft of the vehicle and piloted in said pilot element for endwise movement therein, a spring held captive between the pilot element and said spring distorting member and compressible therebetween for exerting a force against the pilot element to pivot the pawl into said operating position with the ratchet pursuant to forward endwise movement of the said member and to yieldably hold the pawl into such position, and means for releasably holding the spring distorting member against rearward movement subsequent to its endwise forward movement.

6. In combination with a vehicle having an operator's footrest platform containing an opening and a brake holding ratchet below the platform where it is movable fore and aft of the vehicle: a pawl pivotally supported on the platform within said opening and for pivotal movement about an axis extending transversely of the vehicle, said pawl being biased out of a pivoted position placing a portion thereof in cooperative relation with the ratchet, a pilot element on the pawl above said platform, an elongated spring distorting member piloted in the pilot element, said spring distorting member extending fore and aft of the vehicle and being endwise movable in the pilot element and rockable therein within a vertical plane extending fore and aft to the vehicle, a spring surrounding a portion of the spring distorting member rearwardly of the pilot element and held captive between said member and said element, the spring distorting member being operable through the spring to pivot the pawl into cooperative position with the ratchet pursuant to forward endwise movement of such member, the spring distorting member being operable to further compress the spring incident to further forward movement thereof to yieldably hold the pawl in said cooperative position, a hook on the forward end of the spring distorting member and operable to engage a portion of the platform when said member is rocked while so further advanced, and means on the rear end of the spring distorting member adapted for engagement by the toe cap on the shoe of an operator to receive force therefrom for causing such endwise forward movement and such rocking movement.

7. In a releasable locking structure for a brake locking pawl having transverse bearing means, a pilot element on said pawl, an elongated spring distorting member mounted in said pilot element for endwise movement therein transversely of the axis of said bearing means and also rockable in said pilot element within a plane substantially perpendicular to said axis, a hook at an end of the spring distorting element, a spring reacting between said pilot element and spring distorting member for urging said hook toward said element, said pawl being biased to pivot in one direction about said transverse bearing means, and said member being adapted to distort the spring and increase its pressure against the pilot element pursuant to endwise movement of said member in the opposite direction within the pilot element to pivot the pawl in the opposite direction.

8. In a releasable locking structure for a brake locking pawl having transverse bearing means about which it is rockable and also having a ratchet engaging portion spaced transversely of and from the principal axis of said bearing means, a pilot element on said pawl, an elongated spring distorting member mounted on said pilot element for endwise movement therein transversely of said bearing axis in substantial parallelism with a line extending radially from such axis to the ratchet engaging portion of the pawl, said spring distorting member being also rockable in said pilot element within a plane substantially perpendicular to said axis, one end of said spring distorting member being disposed from the pilot element generally toward the ratchet engaging portion of the pawl, a hook on such end of the spring distorting member, a spring reacting between said pilot element and said spring distorting member for urging said member to move endwise in the direction carrying the hook toward the pilot element, said pawl, said pilot element and said spring distorting member being so disposed with respect to said bearing means of the pawl that their collective center of mass is disposed transversely across the bearing axis from the ratchet engaging portion of the pawl to urge the pawl to gravitationally pivot in the direction elevating the pawl when said axis is disposed horizontally, and said spring distorting member being adapted to distort said spring and increase its pressure against the pilot element pursuant to opposite endwise movement of said member in the pilot element to pivot the pawl in the direction for lowering the ratchet engaging portion thereof.

9. In a releasable locking structure for a brake locking pawl having a horizontally disposed transverse axis and having a ratchet engaging portion spaced horizontally from said axis, a pilot element mounted on said pawl, and a horizontally disposed elongated spring distorting member mounted in said pilot element transversely of said axis and also rockable in said pilot element within a vertical plane disposed perpendicularly to said axis, one end of said member being disposed above the ratchet engaging portion of the pawl, a downwardly turned hook upon said end of the elongated member, a spring reacting between said pilot element and said member for urging the member retractively endwise in the pilot element to carry the hook toward the pilot element, and said member being endwise advanceable in the pilot element for distorting the spring incident to transmitting force therethrough to the pilot element for pivoting the pawl about its bearing axis in the direction for moving the ratchet engaging portion downwardly.

10. The combination set forth in claim 9 wherein said pilot element has opposed parallel upright faces extending perpendicularly to said bearing axis of the pawl, and wherein said spring distorting member has a flat intermediate portion piloted between said faces for universal translatory movement in parallelism therewith.

11. The combination set forth in claim 10 wherein the end of said elongated member, oppositely to the end having the hook thereon, has a terminal portion projecting upwardly and endwise therefrom.

ADOLPH ELENEWICZ.

No references cited.